US006455968B2

(12) United States Patent
Honorio et al.

(10) Patent No.: US 6,455,968 B2
(45) Date of Patent: Sep. 24, 2002

(54) ATTACHMENT DEVICE FOR ELECTRICAL EQUIPMENT, SUCH AS AN ALTERNATOR/STARTER MOTOR, IN A CLUTCH HOUSING OF AN AUTOMOBILE

(75) Inventors: François Honorio, Vaureal; René Hulin, Rueil Malmaison; Marc Chantreau, Blainville/Orne; Bernard Schumacher, Sceaux, all of (FR)

(73) Assignee: Peugeot Citroen Automobiles SA, Neuilly sur Seine (FR)

( * ) Notice: Subject to any disclaimer, the term of this patent is extended or adjusted under 35 U.S.C. 154(b) by 1 day.

(21) Appl. No.: 09/749,603

(22) Filed: Dec. 28, 2000

(30) Foreign Application Priority Data

Dec. 29, 1999 (FR) .............................. 99 16641

(51) Int. Cl.$^7$ .......................... B60K 6/00; F02N 11/04; H02K 51/00
(52) U.S. Cl. ...................... 310/102 R; 310/89; 310/92; 310/74; 290/47; 180/65.1; 180/294; 74/7 C
(58) Field of Search ................ 310/78, 75 R, 310/92, 77, 96, 100, 102 R, 74, 89; 290/36 R, 38 R, 38 B, 47; 180/65.1, 65.2, 65.4, 294, 298; 74/7 C

(56) References Cited

U.S. PATENT DOCUMENTS 3,215,877 A * 11/1965 Raver et al. ................ 310/168
4,346,773 A * 8/1982 Hofbauer et al. ........... 180/165
4,870,307 A * 9/1989 Kitamura et al. ......... 123/41.31
4,958,095 A * 9/1990 Uchida et al. ........... 123/41.31
4,998,052 A * 3/1991 Erdman et al. ............. 318/696
5,172,006 A * 12/1992 Suzuki et al. .............. 180/65.2
5,833,022 A * 11/1998 Welke ....................... 180/65.2
5,931,271 A * 8/1999 Haka ........................ 180/65.2
5,934,430 A * 8/1999 Kolomeitsev et al. ..... 192/84.6
5,952,746 A * 9/1999 Mittmann et al. ............ 310/42
6,116,364 A * 9/2000 Taguchi et al. ............. 180/165
6,208,036 B1 * 3/2001 Evans et al. ............... 180/65.2
6,308,794 B1 * 10/2001 Oppitz ...................... 180/65.2
6,311,495 B1 * 11/2001 Shimizu et al. ......... 123/DIG. 8
6,340,339 B1 * 1/2002 Tabata et al. .................. 475/5

FOREIGN PATENT DOCUMENTS

EP        0 621 152      2/1994    ............ B60K/6/10
WO      WO 99/22955     5/1999    ............ B60K/6/06

* cited by examiner

Primary Examiner—Burton S. Mullins
(74) Attorney, Agent, or Firm—Leydig, Voit & Mayer, Ltd.

(57) ABSTRACT

A device for attachment of electrical equipment, such as an alternator/starter motor, in the clutch housing of an automobile. The assembly includes a stator, a rotor, and a support hub of the rotor mounted on a bearing in an independent housing integral with the clutch housing.

18 Claims, 7 Drawing Sheets

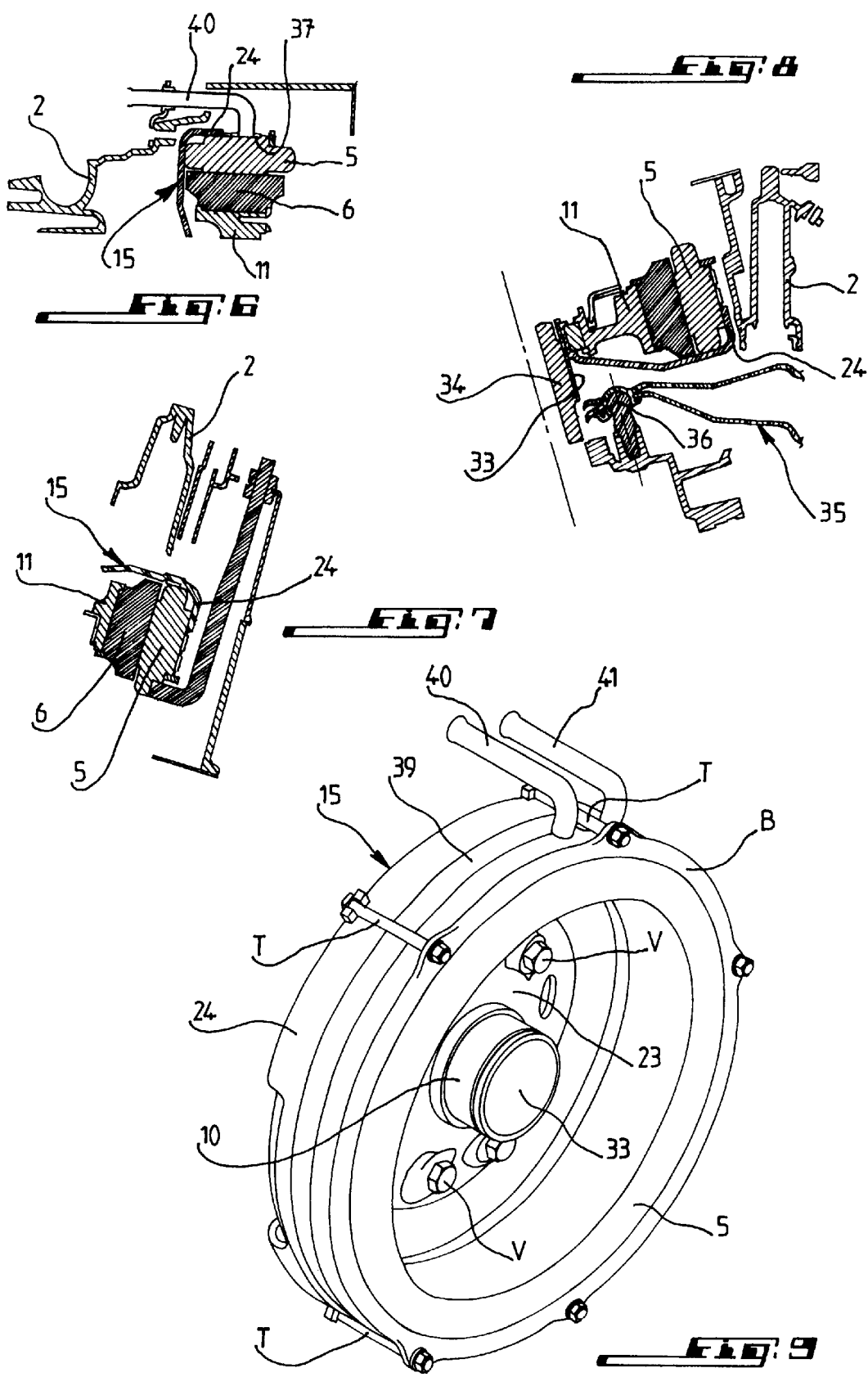

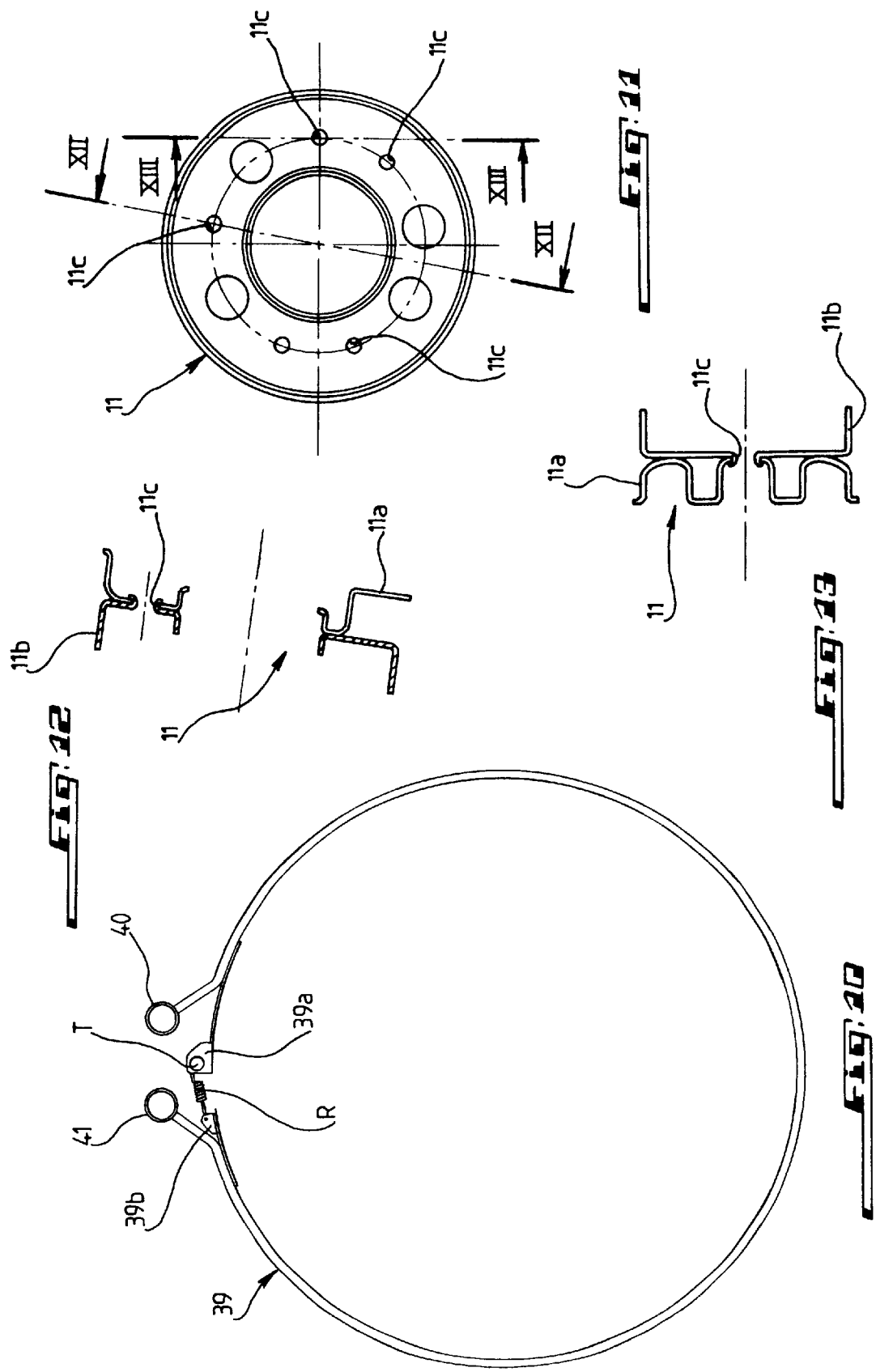

ATTACHMENT DEVICE FOR ELECTRICAL EQUIPMENT, SUCH AS AN ALTERNATOR/STARTER MOTOR, IN A CLUTCH HOUSING OF AN AUTOMOBILE

BACKGROUND OF THE INVENTION

The present invention concerns an attachment device for electrical equipment, such as an alternator/starter motor, in the clutch housing of an automobile.

Such devices are known according to which the electrical equipment is attached in the clutch housing situated between the gearbox and crankcase of the vehicle, the electrical equipment comprising a fixed stator as integral part of the clutch housing and a rotor integral with the engine crankshaft.

This known solution has the major shortcoming of requiring a relatively large air gap between the rotor and stator of about 0.8 mm because of the ovoid movements of the rotor in unison with the crankshaft and problems of expansion of the clutch housing, made of aluminum, during operation of the electrical equipment.

SUMMARY OF THE INVENTION

The invention proposes a device that permits a reduction in the air gap to a specified value and elimination of the problems of expansion of the clutch housing.

For this purpose, according to the invention, the attachment device for electrical equipment, such as an alternator/starter motor, in the clutch housing of an automobile and situated between the gearbox and crankcase of the vehicle, comprises a stator fixed relative to the clutch housing and a rotor that can be rotated by the crankshaft of the engine, where in the assembly comprising the stator, rotor and a support hub of the rotor mounted on a bearing, such as a ball bearing, is housed in an independent housing integral with the clutch housing and at a spacing therefrom.

Preferably, the aforementioned assembly is pre-assembled in the independent housing before attachment of this housing to the clutch housing.

The bearing of the rotor support hub is mounted on a cylindrical central part of the independent housing coaxially surrounding the connection shaft between the crankshaft and the input shaft of the gearbox.

The rotor support hub is connected by rotary coupling means to a cover of the housing integral with the flywheel of the engine.

According to a first variant, the coupling means comprises a collar of elastomeric material, such as silicone, having on one side axially protruding and peripherally spaced hollow prismatic elements with a rectangular base, which are mounted respectively in matching cavities of the rotor support hub and a rigid metal collar having on one side axially protruding and peripherally spaced prismatic elements with rectangular bases that are mounted respectively in the hollow prismatic elements of the elastomeric collar, the metal collar being integral on its side opposite the housing cover.

According to a second variant, the coupling means comprises blocks of elastomeric material, such as silicone, respectively mounted in the circumferentially spaced matching cavities of the rotor support hub, and cogs or pins integral on one side of the housing cover, parallel to the axis of rotation of the rotor and spaced circumferentially, where the cogs or pins engage holes made in the elastomer blocks.

Preferably, the independent housing comprises a lateral wall perpendicular to the crankshaft connected to the cylindrical central part by an oblique wall and a circular wall extending perpendicular to the lateral wall so as to define the seat in which the aforementioned assembly is mounted by its introduction from the open side of the housing opposite the lateral wall, the circular wall enclosing the stator of the electrical equipment on one part.

Advantageously, a circuit is provided to cool the electrical equipment.

Preferably, the cooling circuits consist of an annular band comprising a sealed annular chamber in which a cooling liquid can circulate, such as a mixture of water and antifreeze, and this annular band is arranged on a circular external peripheral surface of the stator, is interposed between the circular wall of the housing and an annular attachment clamp of the stator in the housing, and is held between these two parts by external connecting rods, one of the ends of the annular band being integral with one connecting rod and its other mobile end being connected to the connecting rod by a spring.

The annular band is attached to the independent housing by the external connecting rods, parallel to the circular wall of the housing, anchored on one side to the housing and traversing on the other side an annular mounting clamp of the stator in the housing and being supported and clamped on the circular edge of the annular band opposite the circular edge of the circular wall of the housing.

The cooling circuit also comprises two external supply and discharge tubes for cooling liquid in the annular chamber that are connected in terms of fluid communication to the annular band.

The device also comprises a sleeve fixed in the cylindrical central part of the independent housing and permits guiding of a disengagement stop in translation.

According to one variant, the rotor support hub is made from a single piece of aluminum. According to another variant, the rotor support hub comprises two flanges made of sheet metal attached to each other by crimping.

BRIEF DESCRIPTION OF THE DRAWINGS

The invention will be better understood and other purposes, characteristics, details and advantages thereof will be more readily apparent in the following explanatory description with reference to the appended schematic drawings, given solely as examples and illustrating several variants of the invention, wherein:

FIG. 6 is a partial cross-sectional view along line VI—VI of FIG. 5;

FIG. 7 is a partial cross-sectional view along line VII—VII of FIG. 5;

FIG. 8 is a partial cross-sectional view along line VIII—VIII of FIG. 5;

FIG. 9 is an external, enlarged, perspective view of part of the electrical equipment and its housing with a cooling circuit for this equipment;

FIG. 10 is a front view of an annular band intended to define a cooling chamber of the cooling circuit;

FIG. 11 is a front view of a variant of the rotor support hub of the electrical equipment;

FIG. 12 is a cross-sectional view along line XII—XII of FIG. 11;

FIG. 13 is a cross-sectional view along line XIII—XIII of FIG. 11, and

DETAILED DESCRIPTION

Figure 1:
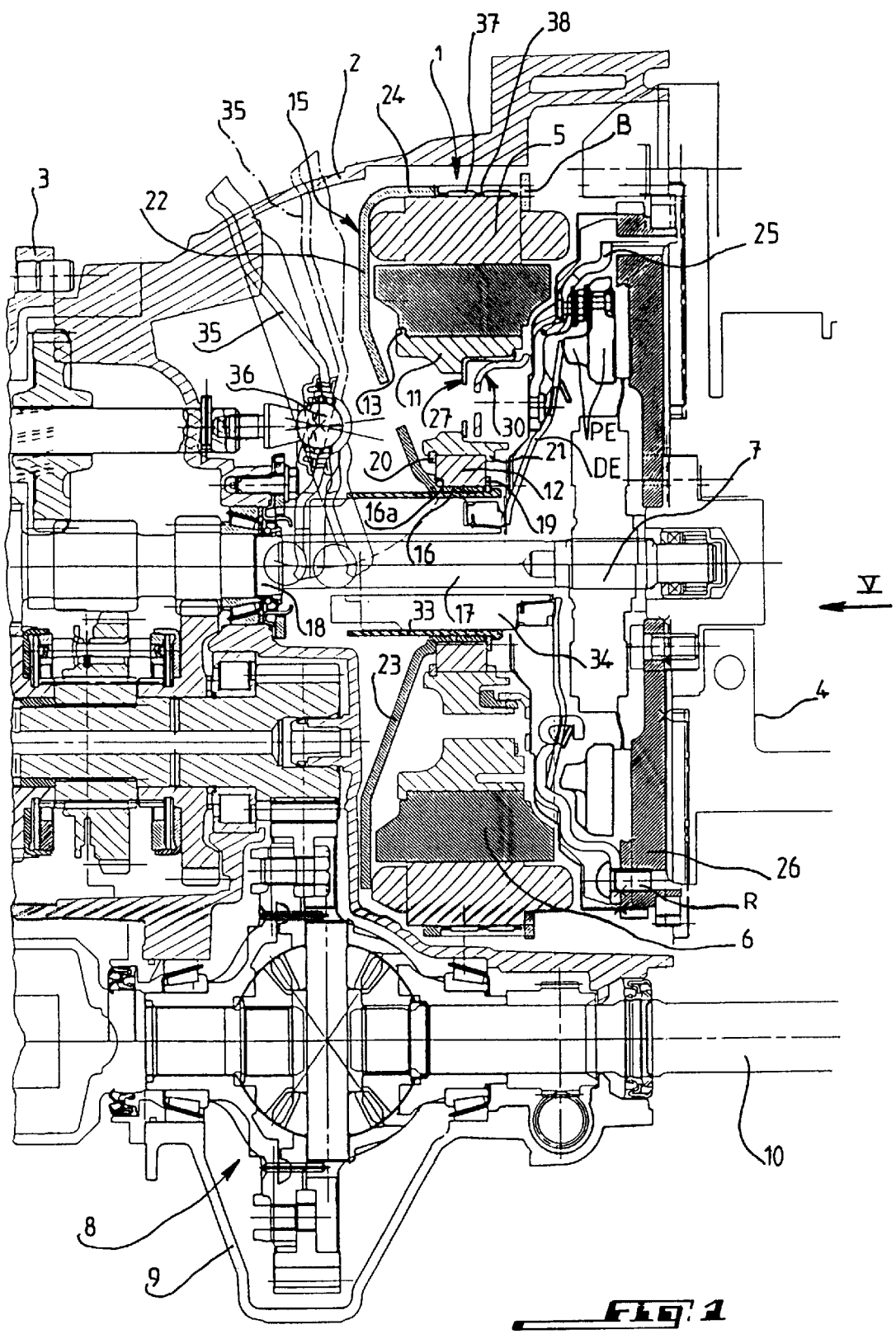
FIG. 1 is a longitudinal section showing the attachment device according to the invention for electrical equipment in a clutch housing of an automobile.

FIGS. 1 to 10 show the first variant of the attachment device for electrical equipment 1, such as a alternator/starter motor, in a clutch housing 2 attached between the gearbox 3 and crankcase 4 of an automobile.

An electrical apparatus simultaneously forming a generator and vehicle starter, known per se, is described, for example, in International Patent Application WO 99/22955.

Thus, the alternator/starter motor 1, which is schematically shown in the figures, essentially comprises an annular stator 5 fixed relative to the clutch housing 2 and an annular rotor 6 housed in this fixed stator 5 and defining an air gap relative to it.

The rotor 6 is rotated by the crankshaft 7 of the internal combustion engine, as will be seen later.

The different components situated in the gearbox 3 are already known per se and do not require description, except for the fact that reference numeral 8 denotes the differential of the vehicle housed in a housing 9 and that the wheel axle is denoted by reference numeral 10.

As shown, rotor 6 is mounted integral on a support hub 11, itself mounted to rotate on a bearing 12, such as a ball bearing.

Figure 3:
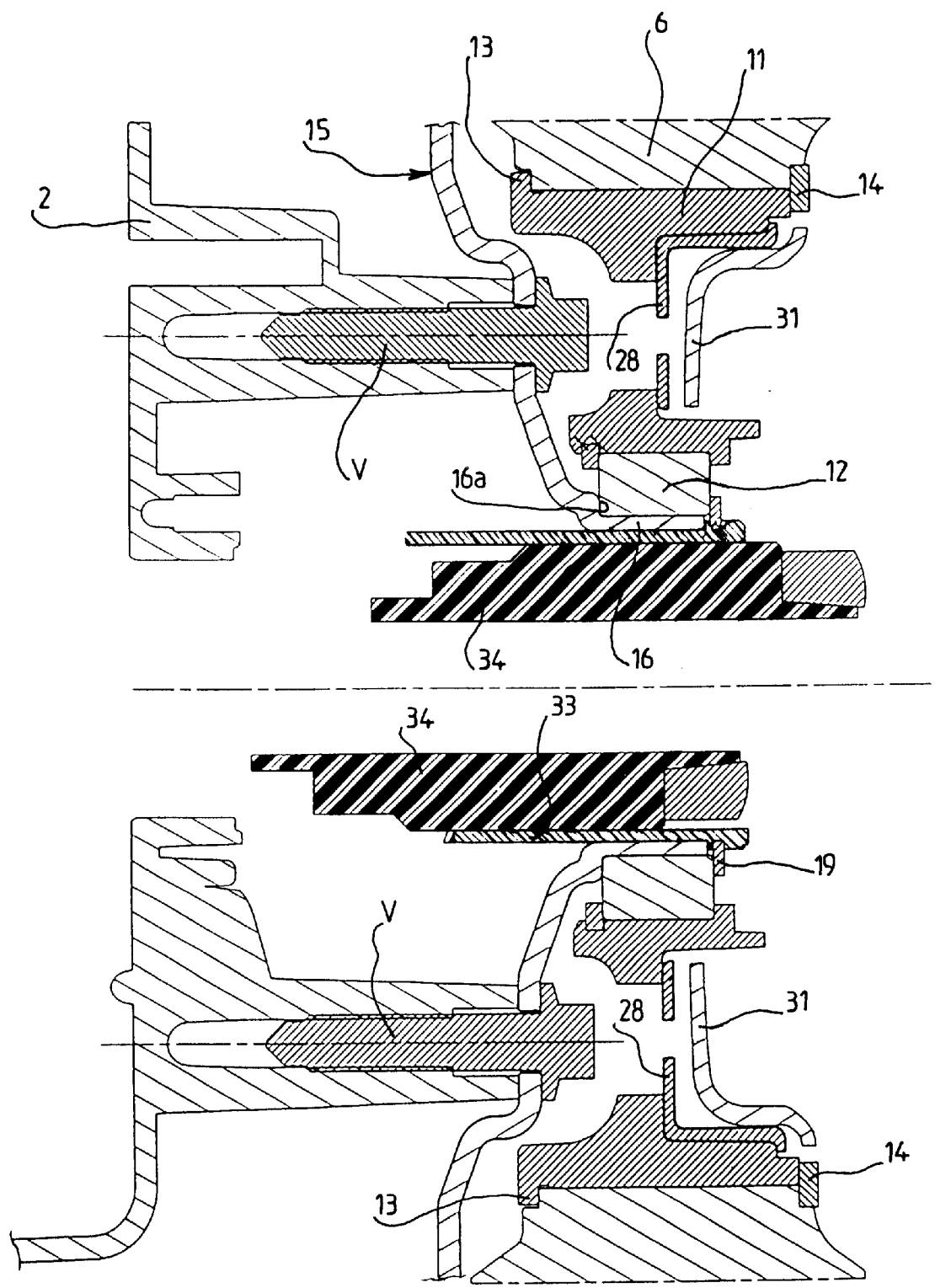
FIG. 3 is a partial, enlarged cross section showing attachment of the housing of the electrical equipment to the clutch housing and the method of sliding of the disengagement stop shown in its two engagement and disengagement positions.

Rotor 6 is held axially on hub 11 on one side by a shoulder 13 of hub 11 and on the other side by an annular collar 14, visible in FIG. 3.

According to the invention, the assembly consisting of stator 5, rotor 6, hub 11, and bearing 12 is mounted in independent housing 15 attached by part of it to the clutch housing 2 by attachment screws V, as clearly follows from FIG. 3, so that the housing 15 is mounted in the clutch housing 2 and spaced therefrom, without being in contact with it, except for the attachment sites via screws V of the housing part 15 to clutch housing 2.

Housing 15 comprises a tubular central part 16 that coaxially surrounds a connection part 17 of crankshaft 7 to the input shaft 18 of the gearbox 3. Bearing 12 is mounted on the tubular central part and is held axially on it by a stop shoulder 16a situated on one end of part 16 and a circlip 19 in the vicinity of its end, as will be seen later. Hub 11 is also held axially on bearing 12, on the one hand, by a circlip 20 mounted in an internal groove of the hub and, on the other hand, by a shoulder 21 of hub 11 supported on bearing 12.

Figure 2:
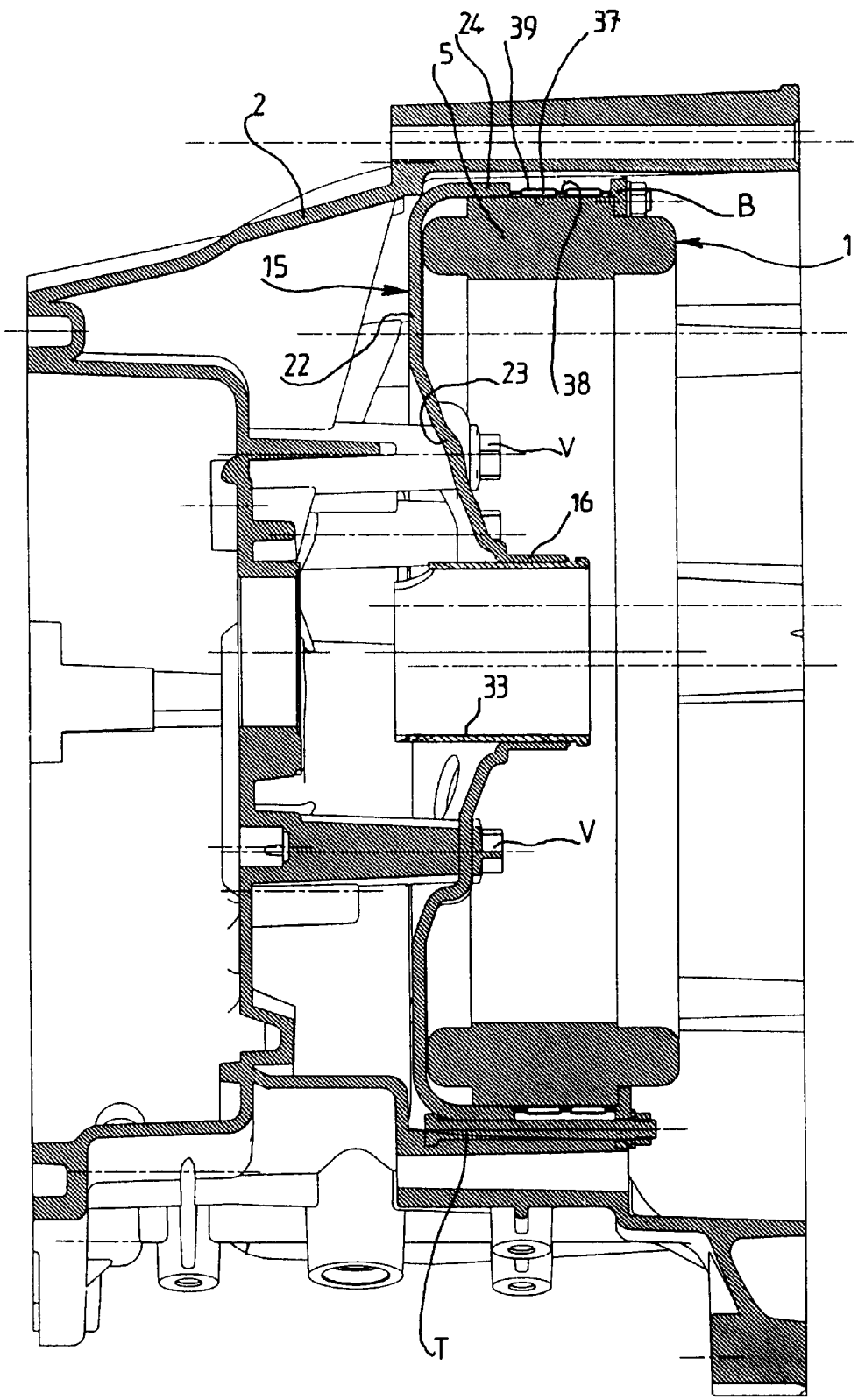
FIG. 2 is a section similar to that of FIG. 1 showing only the clutch housing in which the partially depicted electrical equipment is attached.

Housing 15 also comprises a lateral wall 22 that extends perpendicular to the axes of crankshaft 7 and is connected to the central tubular part 16 via an oblique wall 23. Housing 15 comprises a circular part 24 that extends the upper part of the lateral wall 15, extending perpendicular to it and enclosing stator 5 on its external circular peripheral surface. FIGS. 1 and 2 show that the wall 24 only covers part of the periphery of stator 5 in the axial direction.

It is apparent from the description above that the assembly consisting of stator 5, rotor 6, hub 11 and bearing 12 is pre-assembled in the plant in the housing 15 by introducing it from the open side opposite wall 22 and attached in it, whereupon housing 15 is fastened to the clutch housing by attachment screws V.

With this arrangement, a strictly constant air gap of 0.5 mm is obtained, which permits excellent performance of the electrical equipment.

The support hub 11 of rotor 6 is connected by coupling devices to a housing cover 25, which rotates in unison with flywheel 26 of the engine via rivets R, the flywheel being entrained by the crankshaft 7. These connection devices, as better follows from FIG. 4, include a collar 27 made of elastomeric material, such as silicone, having on one side a certain number of hollow prismatic elements with axially protruding rectangular bases 28 that are circumferentially spaced at equal intervals and are attached in cavities of corresponding shape 29 circumferentially formed at equal intervals in hub 11.

The connection means also includes a rigid metal collar 30 comprising, on one side, prismatic elements with axially protruding rectangular bases 31 that are spaced circumferentially at equal intervals and are fastened respectively in the hollow elements 28 of the elastomer collar 27 on the other side. The metal collar 30 is attached on its side opposite the protruding elements 31 to the housing cover 25 by means of rivets that pass through holes 32 of the collar 30 formed in the connection parts between the protruding elements 31.

Thus, the form of the rigid collar 30 matches the elastomer collar 27, and the two collars are assembled in hub 11 so as to form a relatively compact assembly. The protruding elements 28 of the elastomer collar 27 are active elements in the two directions of rotation of the rotating electrical equipment and have sufficient dimensions to transmit the necessary torque.

FIG. 3 more clearly shows that a sleeve 33 is attached in the central part 16 of housing 15 and serves as means of translatory guiding within it of the disengagement stop 34, which is shown in the disengagement position in the upper part of FIG. 3, whereas it occupies the engagement position in the lower part of FIG. 3. The disengagement stop 34, as is known per se, is moved by a control bracket 35 mounted to rotate on clutch housing 2 by a pivot pin 36 so as to control translatory movement of the disengagement stop 34, which acts on its end opposite bracket 35 on a clutch diaphragm DE, which itself acts on the clutch plates PE. The circlip 19 for axial holding of bearing 12 is mounted in a radially external groove of bracket 33.

Bracket 33, which permits guiding of disengagement stop 34 from the outside, has the advantage relative to the conventional known solutions of not causing troublesome vibrations. According to the known solutions, the disengagement stop is guided on a tube, i.e., it slides on this tube; to adapt this solution to the invention would result in increased length of the guide tube and, as a result, the generation of vibration.

FIGS. 2 and 9 also show that the stator 5 is held in position in housing 15 by connecting rods T situated on the outside of the circular wall 24 of housing 15 and extending parallel thereto, anchored on one side to housing 15 and traversing on the opposite side an annular clamp B so that by tightening the nuts of connecting rods T, the annular clamp B axially forces stator 5 against the internal face of lateral wall 22.

Figure 4:
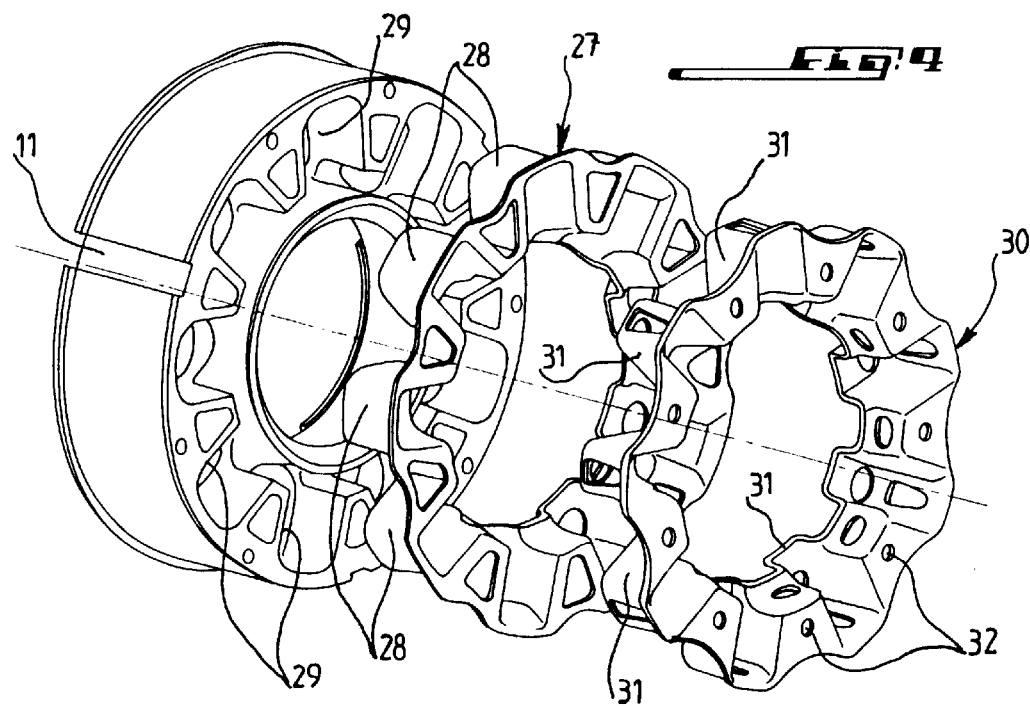
FIG. 4 is an enlarged, exploded, perspective view of means that permit coupling of the rotor support hub of the electrical equipment to the flywheel of the engine.
Figure 5:
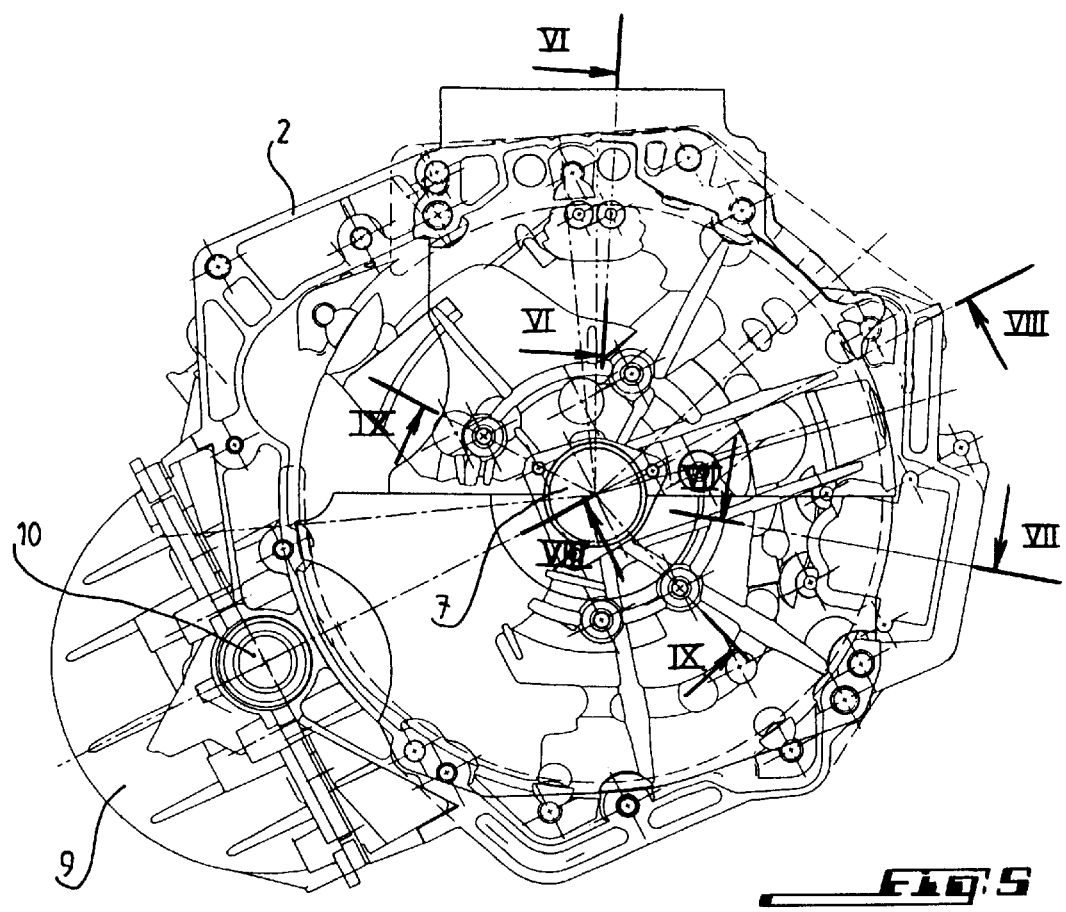
FIG. 5 is a view on a reduced scale along arrow V of FIG. 1 of different crankcases.

As follows in particular from FIG. 4, the support hub 11 of rotor 6 is made from a single piece of aluminum. According to the variant depicted in FIGS. 10 to 12, hub 11 is made from two flanges of sheet metal, 11a, 11b, fastened to each other by crimping at the level of holes 11c formed in the two flanges. More precisely, the circular edge of each hole of one of the flanges, for example, flange 11b, is curved by deformation to clamp the circular edge of the hole corresponding to the other flange. Of course, the external periphery of the two flanges 11a, 11b forming the hub has a geometric configuration similar to that of the periphery of hub 11, which is the object of the variant just described with reference to FIG. 1, for holding rotor 6 thereon.

FIGS. 1 to 10 also show the presence of a cooling circuit for the electrical equipment 1.

This cooling circuit consists of an annular band 39 containing a sealed annular chamber 37 in which a cooling liquid circulates. This annular band is arranged on the external circular peripheral surface of stator 5.

FIG. 9 in connection with FIG. 2 shows that the annular band 39 is interposed between the circular wall 24 of housing 15 and the clamp B and is held with axial play between these two parts by connecting rods T. FIG. 10 shows attachment of the ends of the annular band 39 in which one of the ends 39a of the band is integral with the connecting rod T, whereas its other mobile end 39b is connected to connecting rod T by a spring R, thus permitting compensation for expansion of the electric machine.

Supply of cooling liquid, such as water, into the cooling chamber 37 occurs through a tube 40 connected to annular band 39 and discharging through it to be in fluid communication with chamber 37. The output of cooling liquid occurs through a tube 41 also in fluid communication with the cooling chamber 37 through annular band 39.

Figure 14:
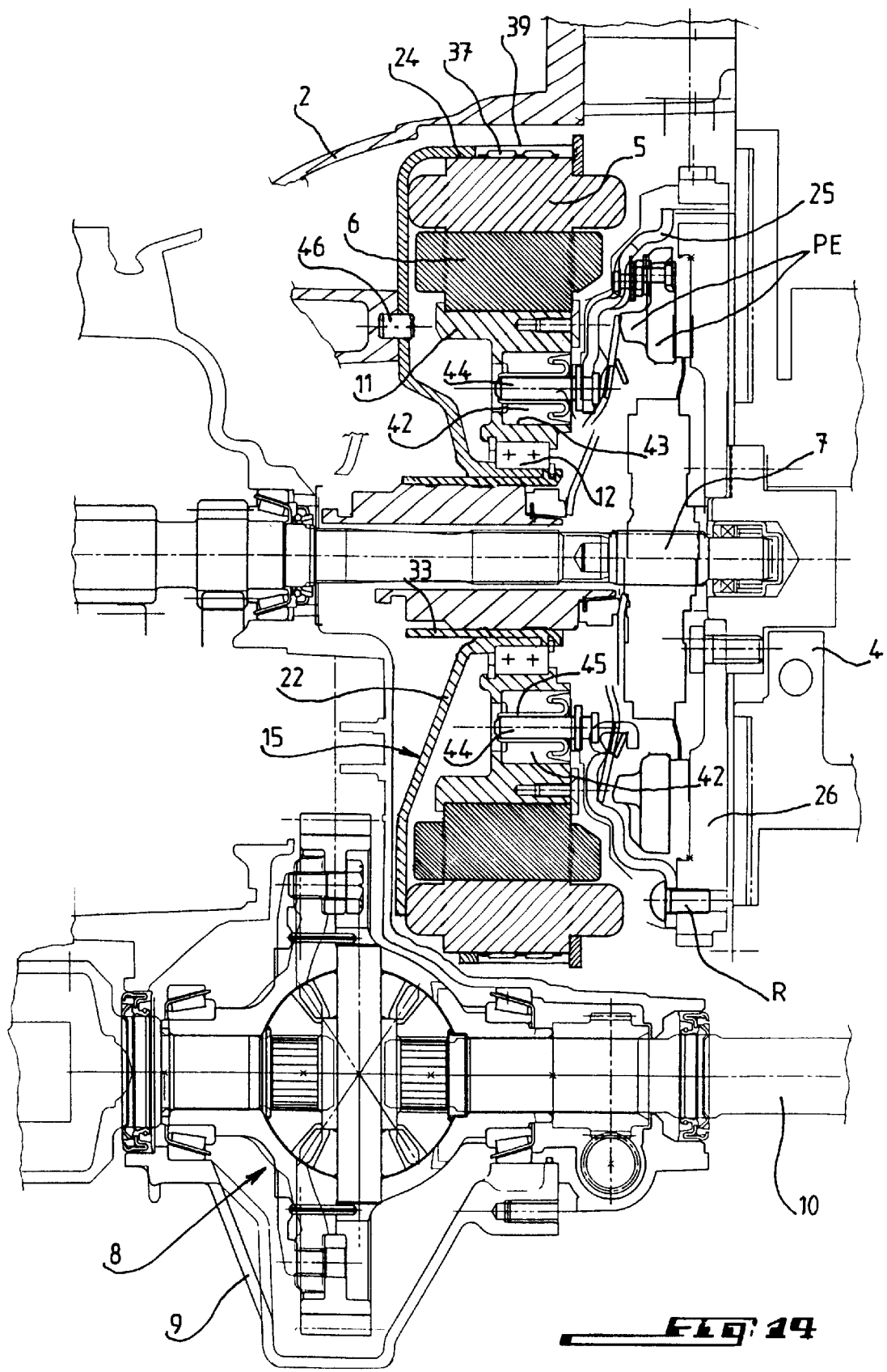
FIG. 14 is a cross-sectional view similar to that of FIG. 1 showing another variant of the attachment device of the invention.

FIG. 14 shows a variant of the means of connection of the support hub 11 of rotor 6 to the clutch housing 25.

These means of connection include a certain number of blocks 42 made of elastomer material, such as silicone, which are fastened respectively in matching cavities 43 made circumferentially at equal intervals in support hub 11.

The housing cover 25 rotates in unison with the elastomer block 42 by means of cogs or pins 44 integral with the housing cover 25 and extending on one side of it, being spaced circumferentially at equal intervals. The cogs 44 are engaged in the holes of the elastomer blocks 42 and attached therein, extending parallel to the crankshaft 7 by means of metal sleeves 45 attached in the elastomer blocks, which exert radial forces on sleeves 45 directly toward cogs 44 to block them in sleeves 45. The latter are well fixed in their corresponding cavities 43 by being force-fit.

FIG. 14 also shows that the independent housing 15 is attached to the clutch housing 2 by a certain number of pins 46, only one of which is shown, traversing the lateral wall 22 of housing 15 and force-fit in the corresponding blind holes of clutch housing 2.

The device of the invention described in the first and second variants permits attachment of electrical equipment 1 in the clutch housing 2, eliminating problems of positioning of the air gap of the equipment and problems of expansion of the aluminum clutch housing during operation of the electrical equipment. Moreover, factory pre-assembly of the different components of the electrical equipment in the independent housing 15 permits an appreciable saving of assembly time and, as a result, a reduction in cost. Moreover, this also has the advantage of permitting verification of operation of the electrical machine and its performance.

What is claimed is:

1. An attachment device for attaching an alternator/starter motor in a clutch housing of a vehicle, situated between a gearbox and a crankcase of the vehicle, the alternator/starter motor comprising a stator fixed relative to the clutch housing and a rotor that can be rotated by a crankshaft wherein an assembly comprising the stator, the rotor, and a support hub of the rotor, the support hub being mounted on a bearing, is housed in an independent housing integral with the clutch housing and spaced therefrom.

2. The device according to claim 1, wherein the assembly is assembled in the independent housing before attachment to the clutch housing.

3. The device according to claim 1, wherein the bearing of the support hub of the rotor is mounted on a cylindrical central part of the independent housing, coaxially surrounding a connection shaft between the crankshaft and an input shaft of the gearbox.

4. The device according to claim 3, wherein the independent housing contains a lateral wall perpendicular to the crankshaft, connected to the cylindrical central part by an oblique wall and a circular wall perpendicular to the lateral wall.

5. The device according to claim 4, including a sleeve fixed in the cylindrical central part of the independent housing guiding a disengagement stop in translation.

6. The device according to claim 1, wherein the support hub of the rotor is connected by rotary coupling means to an integral housing cover of a flywheel of an engine.

7. The device according to claim 6, wherein the coupling means comprises a collar of an elastomeric material having on one side hollow prismatic elements with axially protruding rectangular bases that are circumferentially spaced and attached in corresponding cavities of the support hub of the rotor, and a rigid metal collar which has on one side prismatic elements with axially protruding rectangular bases that are circumferentially spaced and are attached to the hollow prismatic elements of the elastomeric collar, the rigid metal collar being integral on a side opposite the housing cover.

8. The device according to claim 6, wherein the coupling means comprises blocks of elastomeric material attached in circumferentially spaced corresponding cavities of the support hub of the rotor and cogs or pins on one side of the housing cover parallel to the axis of rotation of the rotor and circumferentially spaced, the cogs or pins engaging respective holes in the blocks.

9. The device according to claim 6, including a cooling circuit for the electrical equipment.

10. The device according to claim 9, wherein the cooling circuit includes an annular band containing a sealed annular chamber in which a cooling liquid circulates, the annular metal band being arranged on a peripheral surface of the stator.

11. The device according to claim 10, wherein the annular band is interposed between the circular wall of the housing and including an annular bracket for attachment of the stator in the housing and held by external connecting rods, and wherein a first end of the annular band is integral with one of the connecting rods and a second end of the annular band is connected to the connecting rod via a spring.

12. The device according to claim 10, wherein the cooling circuit includes two tubes for supplying and discharging cooling liquid in the annular chamber and in fluid communication with the annular band.

13. The device according to claim 1, wherein the support hub of the rotor is a single piece of aluminum.

14. The device according to claim 1, wherein the support hub of the rotor includes two sheet metal flanges attached to each other by crimping.

15. An attachment device for attaching an alternator/starter motor in a clutch housing of a vehicle, situated between a gearbox and a crankcase of the vehicle, the alternator/starter motor comprising a stator fixed relative to the clutch housing and a rotor that can be rotated by a crankshaft, wherein an assembly comprising the stator, the rotor, and a support hub of the rotor, the support hub being mounted on a bearing, is housed in an independent housing located inside the clutch housing, integral with the clutch housing and spaced therefrom, and wherein the bearing of the support hub of the rotor is mounted on a cylindrical central part of the independent housing, coaxially surrounding a connection shaft between the crankshaft and an input shaft of the gearbox.

16. An attachment device for attaching an alternator/starter motor in a clutch housing of a vehicle, situated between a gearbox and a crankcase of the vehicle, the alternator/starter motor comprising a stator fixed relative to the clutch housing and a rotor that can be rotated by a crankshaft, wherein an assembly comprising the stator, the rotor, and a support hub of the rotor, the support hub being mounted on a bearing, is housed in an independent housing located inside the clutch housing, integral with the clutch housing and spaced therefrom, the bearing of the support hub of the rotor being mounted on a cylindrical central part of the independent housing, coaxially surrounding a connection shaft between the crankshaft and an input shaft of the gearbox, and wherein the support hub of the rotor is connected by rotary coupling means to an integral housing cover of a flywheel of an engine.

17. An attachment device for attaching an alternator/starter motor in a clutch housing of a vehicle, situated between a gearbox and a crankcase of the vehicle, the alternator/starter motor comprising a stator fixed relative to the clutch housing and a rotor that can be rotated by a crankshaft, wherein an assembly comprising the stator, the rotor, and a support hub of the rotor, the support hub being mounted on a bearing, is housed in an independent housing located inside the clutch housing, integral with the clutch housing and spaced therefrom, the bearing of the support hub of the rotor being mounted on a cylindrical central part of the independent housing, coaxially surrounding a connection shaft between the crankshaft and an input shaft of the gearbox, the support hub of the rotor being connected by rotary coupling means to an integral housing cover of a flywheel of an engine, and wherein the coupling means comprises a collar of an elastomeric material having on one side hollow prismatic elements with axially protruding rectangular bases that are circumferentially spaced and attached in corresponding cavities of the support hub of the rotor, and a rigid metal collar which has on one side prismatic elements with axially protruding rectangular bases that are circumferentially spaced and are attached to the hollow prismatic elements of the elastormeric collar, the rigid metal collar being integral on a side opposite the housing cover.

18. An attachment device for attaching an alternator/starter motor in a clutch housing of a vehicle, situated between a gearbox and a crankcase of the vehicle, the alternator/starter motor comprising a stator fixed relative to the clutch housing and a rotor that can be rotated by a crankshaft, wherein an assembly comprising the stator, the rotor, and a support hub of the rotor, the support hub being mounted on a bearing, is housed in an independent housing located inside the clutch housing, integral with the clutch housing and spaced therefrom, the bearing of the support hub of the rotor being mounted on a cylindrical central part of the independent housing, coaxially surrounding a connection shaft between the crankshaft and an input shaft of the gearbox, the support hub of the rotor being connected by rotary coupling means to an integral housing cover of a flywheel of an engine, and wherein the coupling means comprises blocks of elastomeric material attached in circumferentially spaced corresponding cavities of the support hub of the rotor and cogs or pins on one side of the housing cover parallel to the axis of rotation of the rotor and circumferentially spaced, the cogs or pins engaging respective holes in the blocks.

* * * * *